United States Patent
Kurebayashi (10) Patent No.: US 10,480,695 B2
(45) Date of Patent: Nov. 19, 2019

(54) JOINT STRUCTURE AND ROBOT

(71) Applicant: FANUC CORPORATION, Yamanashi (JP)

(72) Inventor: Hidenori Kurebayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 15/674,628

(22) Filed: Aug. 11, 2017

(65) Prior Publication Data

US 2018/0058615 A1    Mar. 1, 2018

(30) Foreign Application Priority Data

Aug. 31, 2016   (JP) .................. 2016-170338

(51) Int. Cl.
*F16L 23/16*     (2006.01)
*F16L 23/00*     (2006.01)
*B25J 17/00*     (2006.01)
*B25J 19/00*     (2006.01)

(52) U.S. Cl.
CPC ............... *F16L 23/16* (2013.01); *B25J 17/00* (2013.01); *B25J 19/0079* (2013.01); *F16L 23/003* (2013.01)

(58) Field of Classification Search
CPC .......... F16L 23/16; F16L 23/003; B25J 17/00; B25J 19/0079

See application file for complete search history.

(56) References Cited

U.S. PATENT DOCUMENTS 5,087,057 A    2/1992  Kurkowski
5,212,432 A *  5/1993  Ohtani ............... B25J 9/046
                                                    310/56

(Continued)

FOREIGN PATENT DOCUMENTS

EP    0169905 B1 * 11/1990 ............. B25J 9/046
JP    S61-297095 A    12/1986

(Continued)

OTHER PUBLICATIONS

Japanese Office Action dated Oct. 2, 2018, in connection with corresponding JP Application No. 2016-170338 (9 pgs., including machine-generated English translation).

(Continued)

*Primary Examiner* — Vicky A Johnson
(74) *Attorney, Agent, or Firm* — Maier & Maier, PLLC (57) ABSTRACT

An object is to exhibit a higher sealing performance against an external pressure, to more reliably prevent breakage of a sealed state established by an inner seal member, and to maintain the soundness of inner mechanical components. Provided is a joint structure including two joint members, a driving mechanism that rotationally drives the two joint members about a predetermined axis relative to each other, two seal members forming a seal between the joint members at positions doubly surrounding the outside of a lubricant storing part in the driving mechanism, and a pressure-applying means that makes the air pressure in a space provided between the two seal members, higher than the pressure of the outside air.

7 Claims, 8 Drawing Sheets

(56) References Cited

U.S. PATENT DOCUMENTS

| | | | | |
|---|---|---|---|---|
| 8,434,992 | B2* | 5/2013 | Tara | B25J 9/042 414/744.3 |
| 2013/0264777 | A1 | 10/2013 | Himeno et al. | |
| 2015/0258693 | A1* | 9/2015 | Yazawa | B25J 19/0054 74/490.03 |
| 2018/0058615 | A1* | 3/2018 | Kurebayashi | B25J 17/00 |

FOREIGN PATENT DOCUMENTS

| | | |
|---|---|---|
| JP | H06-62267 U | 9/1994 |
| JP | H07-075992 A | 3/1995 |
| JP | H08-004776 A | 1/1996 |
| JP | 09-029682 A | 2/1997 |
| JP | H10-159761 A | 6/1998 |
| JP | H10-180678 A | 7/1998 |
| JP | 2001-254787 A | 9/2001 |
| JP | 2002-022021 A | 1/2002 |
| JP | 2003-181788 A | 7/2003 |
| JP | 2007-023312 A | 2/2007 |
| JP | 2009-107116 A | 5/2009 |
| JP | 2013-072546 A | 4/2013 |
| JP | 2013-111694 A | 6/2013 |
| WO | 2012/081630 A1 | 6/2012 |

OTHER PUBLICATIONS

Japanese Search Report dated Sep. 4, 2018, in connection with corresponding JP Application No. 2016-170338 (32 pgs.,including machine-generated English translation).

Office Action dated Mar. 5, 2019 in corresponding Japanese Application No. 2016-170338; 6 pages.

* cited by examiner

JOINT STRUCTURE AND ROBOT

CROSS-REFERENCE TO RELATED APPLICATIONS

This application is based on Japanese Patent Application No. 2016-170338, the contents of which are incorporated herein by reference.

TECHNICAL FIELD

The present invention relates to a joint structure and a robot.

BACKGROUND ART

A known joint structure in the related art includes a double seal member that can seal a gap between relatively moving surfaces by lip contact to prevent the entrance of dust and water drops into mechanical components, such as a reduction gear and a bearing, provided inside a joint and to prevent leakage of lubricant from the mechanical components (see, for example, PTL 1).

With this joint structure, for example, for the purpose of cleaning a workpiece that is formed of machine processed components by exposing the workpiece to a fixed washing-liquid spraying nozzle, even when the workpiece is strongly hit with droplets of washing liquid sprayed from the washing-liquid spraying nozzle, the sealed state established by an inner seal member can be maintained unbroken.

CITATION LIST

Patent Literature

{PTL 1} Japanese Unexamined Patent Application, Publication No. 2009-107116

SUMMARY OF INVENTION

An object of the present invention is to provide a joint structure and a robot that can exhibit higher sealing performance against an external pressure, can more reliably prevent breakage of a sealed state established by an inner seal member, and can maintain the soundness of inner mechanical components.

Solution to Problem

An aspect of the present invention is a joint structure including: two joint members; a driving mechanism that drives the two joint members so as to rotate about a predetermined axis relative to each other; two seal members forming a seal between the two joint members at positions doubly surrounding the outside of a lubricant storing part in the driving mechanism; and a pressure-applying means that makes the air pressure in a space provided between the two seal members higher than the pressure of the outside air.

In the above aspect, at least one of the two seal members may be a lip seal.

In the above aspect, the seal member on the outer side may have lower pressure resistance than the seal member on the inner side.

In the above aspect, the joint structure may further include, on the outside of the seal member on the outer side, a protection wall that prevents the entrance of foreign matter from the outside.

In the above aspect, the seal member on the outer side may be formed of an elastic material and may have a cut portion at at least one circumferential position.

In the above aspect, the cut portion may be inclined with respect to the radial direction.

In the above aspect, the seal member on the outer side may be formed of a ring-shaped resin material.

In the above aspect, the seal member on the outer side may have a cut portion at at least one circumferential position.

In the above aspect, the seal member on the outer side may be formed of two or more arc-shaped members divided by cut portions provided at two or more circumferential positions.

Another aspect of the present invention is a joint structure including: two joint members; a driving mechanism that drives the two joint members so as to rotate about a predetermined axis relative to each other; a seal member that forms a seal between the two joint members at a position surrounding the outside of a lubricant storing part in the driving mechanism; a slit forming member that is disposed at a position surrounding the outside of the seal member and that narrows the gap between the two joint members; and a pressure-applying means that makes the air pressure in a space provided between the slit forming member and the seal member higher than the pressure of the outside air.

Another aspect of the present invention is a robot including any one of the above-described joint structures.

In the above aspect, the robot may further include a determination means that determines whether the seal member is deteriorated or damaged on the basis of the gas flow rate value measured by the flow-rate measuring means.

DESCRIPTION OF EMBODIMENTS

A joint structure 10 and a robot 1 according to a first embodiment of the present invention will be described below with reference to the drawings.

Figure 1:
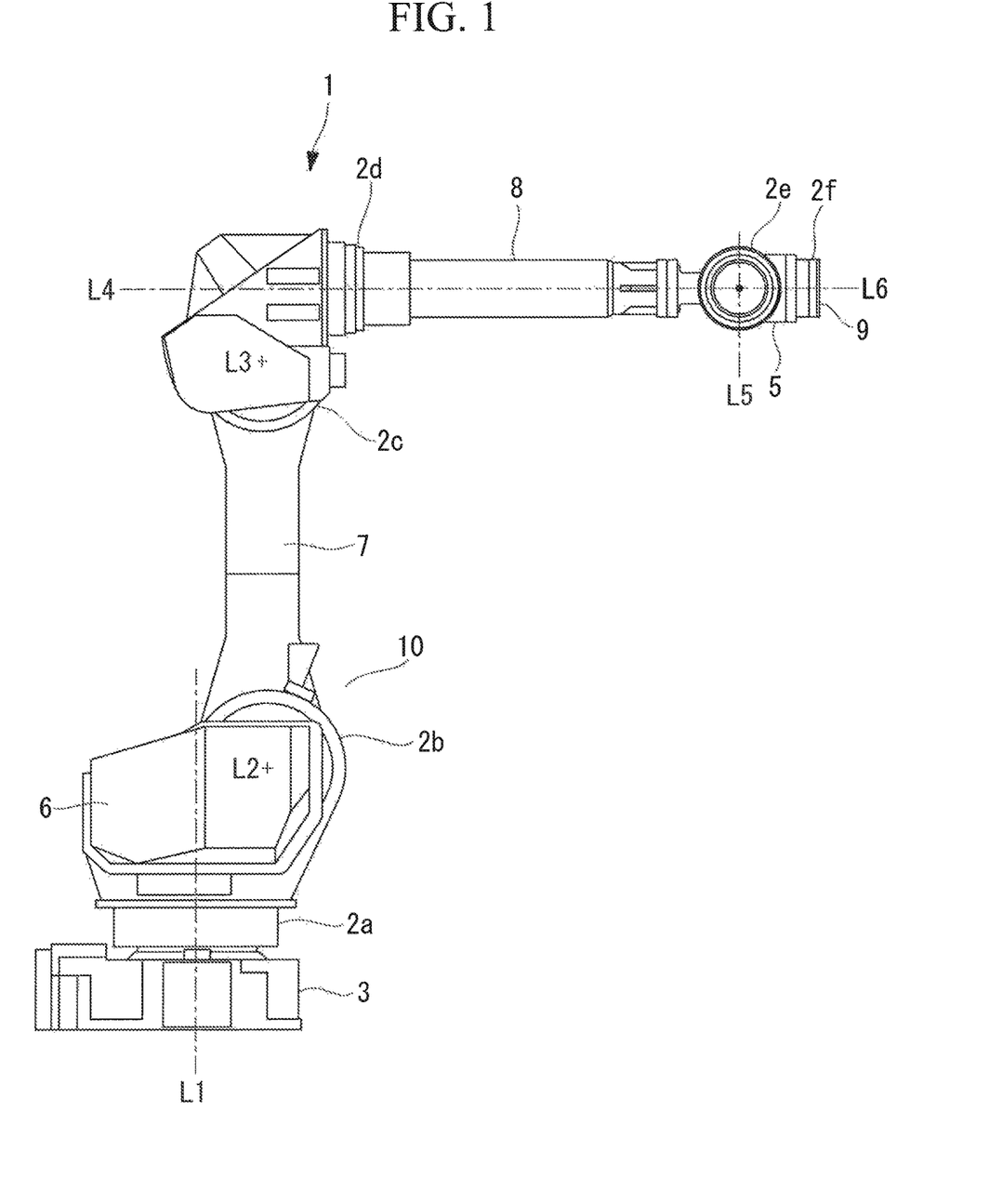
FIG. 1 is an overall view of a robot according to a first embodiment of the present invention.
Figure 2:
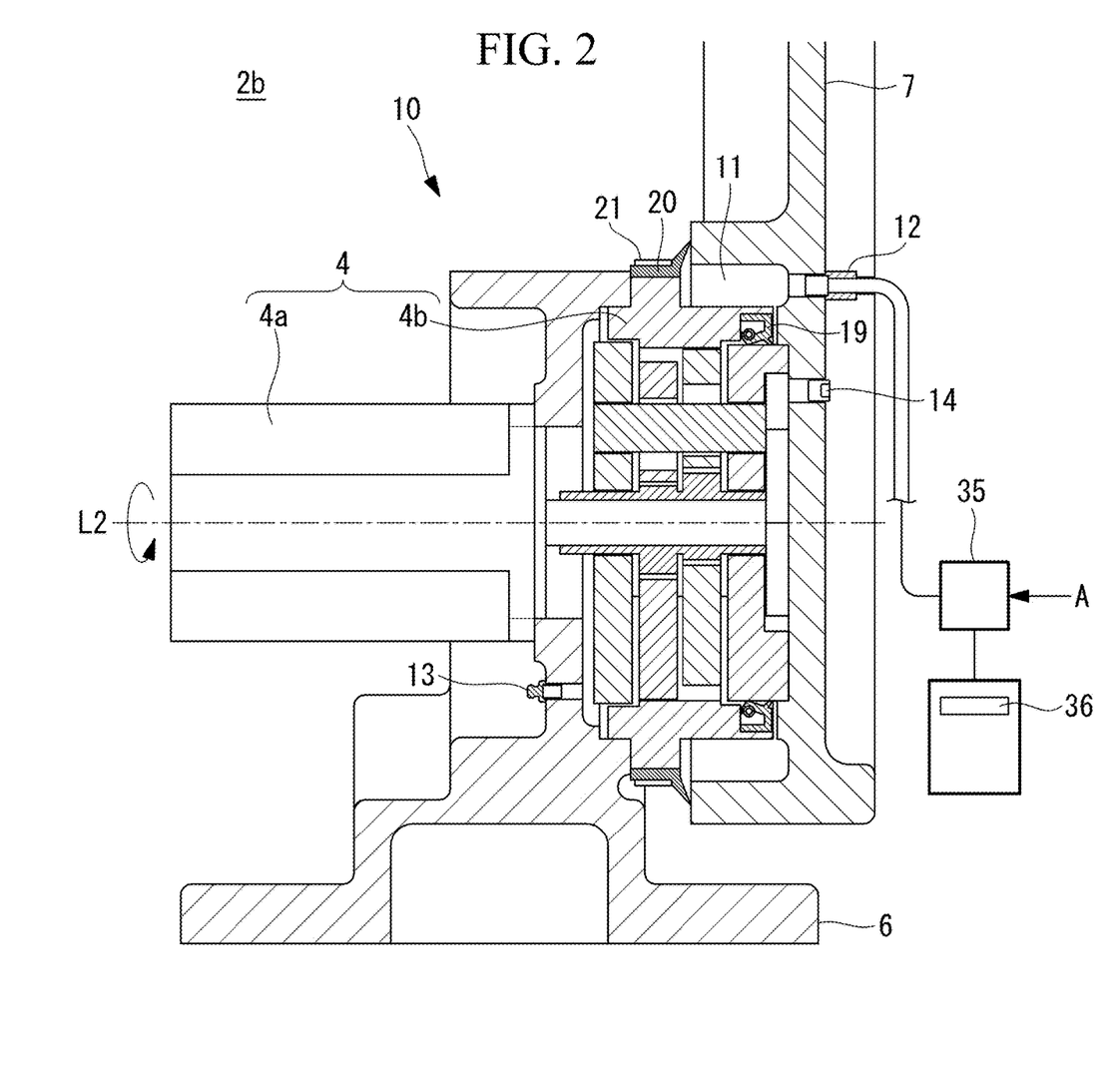
FIG. 2 is a partial longitudinal sectional view of a joint member of the robot in FIG. 1.
Figure 3A:
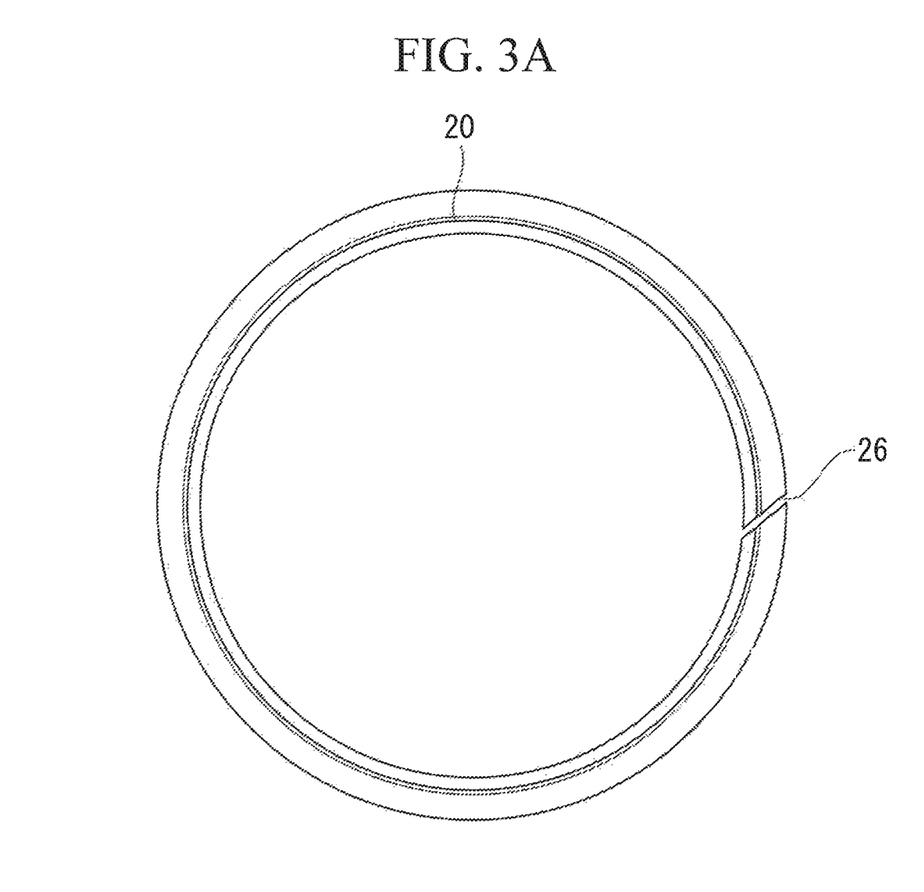
FIG. 3A is a front view showing an example of a seal member for sealing a gap in a joint member of the robot in FIG. 1.
Figure 3B:
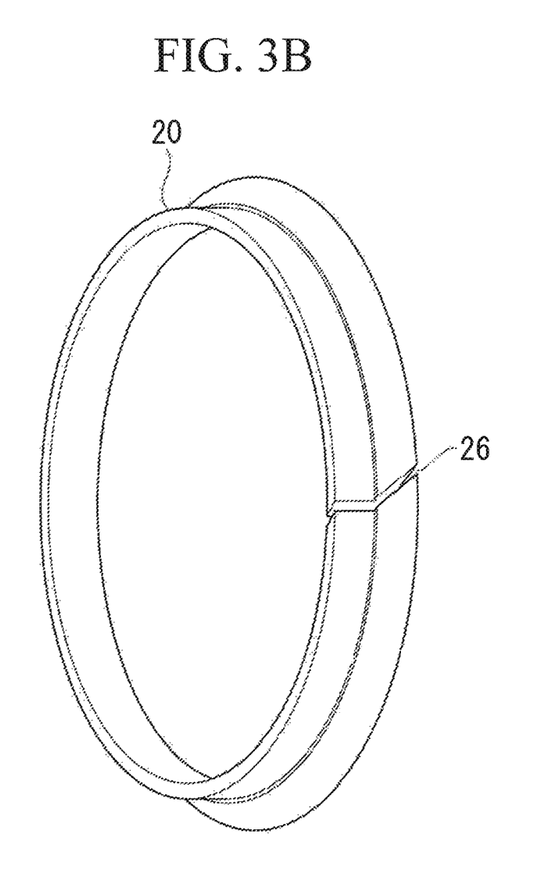
FIG. 3B is a perspective view showing the example of the seal member for sealing the gap in the joint member of the robot in FIG. 1.

FIG. 1 is an overall view of the robot 1 according to this embodiment, and FIG. 2 is a partial longitudinal sectional view of the joint structure 10 at a joint part 2b (joint member) of the robot 1 in FIG. 1. FIG. 3A is a front view showing an example of a seal member 20 in the joint part 2b of the robot 1 in FIG. 1, and FIG. 3B is a perspective view.

As shown in FIG. 1, the robot 1 according to this embodiment includes: a base 3; a rotary stage 6 that is supported on the base 3 so as to be rotatable about a vertical axis L1; a first arm 7 that can pivot about an axis L2, which is perpendicular to the axis L1; and a second arm 8 that can pivot about an axis L3, which is disposed at a distance from the axis L2 so as to be parallel thereto. The second arm 8 is also rotatable about an axis L4, which is perpendicular to the axis L3. A wrist part 5 is coupled to the distal end of the second arm 8, and the wrist part 5 is provided so as to be rotatable about an axis L5, which is perpendicular to the axis L4. The wrist part 5 is provided with a flange 9, to which an end effector can be attached and which is rotatable about an axis L6, which is perpendicular to the axis L5.

The members constituting the robot 1, such as the base 3, the rotary stage 6, the first arm 7, the second arm 8, and the wrist part 5, are coupled to one another via joint parts 2.

Specifically, the base 3 and the rotary stage 6 are coupled together via a first joint part 2a (joint member) so as to be rotatable, and the rotary stage 6 and the first arm 7 are coupled together via the second joint part 2b so as to be pivotable. The first arm 7 and the second arm 8 are coupled together via a third joint part 2c (joint member) and a fourth joint part 2d (joint member), and the second arm 8 and the wrist part 5 are coupled together via a wrist joint part 2e (joint member). The flange 9 is coupled to the wrist part 5 via a final joint part 2f (joint member).

This robot 1 is provided with flow-rate measuring units 35 (flow-rate measuring means) (not shown) that measure the flow rates of air (gas) A supplied to the interior of the joint parts, and determination units 36 (determination means) that determine whether the seal members (described below) are deteriorated or damaged on the basis of the flow rate values of the air A measured by the flow-rate measuring units 35.

The joint structure according to this embodiment will be described below with reference to the drawings.

In this embodiment, although the joint structure 10 at the joint part 2b, which rotates the first arm 7 relative to the rotary stage 6, will be described as a representative example, the other joint parts may also have the same joint structure.

As shown in FIG. 2, the joint structure 10 according to this embodiment includes the rotary stage 6, the first arm 7, a driving mechanism 4 that drives the first arm 7 so as to rotate about the axis L2, which is horizontal with respect to the rotary stage 6, and a sealing means that forms a seal between the rotary stage 6 and the first arm 7. The driving mechanism 4 includes a motor 4a and a reduction gear 4b (lubricant storing part) that transmits the speed-reduced rotation of the motor 4a to the first arm 7.

The reduction gear 4b stores lubricant inside thereof, a lubricant supply port 13 through which the lubricant is supplied to the reduction gear 4b, and a lubricant discharge port 14 through which degraded lubricant is discharged to the outside.

The sealing means includes: an inner seal member 19 that is disposed between a fixed part of the reduction gear 4b, which is fixed to the rotary stage 6, and a movable part of the reduction gear 4b, which is fixed to the first arm 7, to seal the gap therebetween; an outer seal member 20 that seals the gap between the fixed part of the reduction gear 4b and the first arm 7, at a position surrounding the outside of the inner seal member 19; and a pressure-applying part (pressure-applying means) 12 that applies pressure to a space 11 defined between the inner seal member 19 and the outer seal member 20.

The sealing means prevents leakage, to the outside, of the lubricant and dust produced by partial wear and prevents the entrance of liquid droplets and foreign matter into the interior of the joint part 2b from the outside.

The two seal members that form a seal between the two joint parts are provided at positions doubly surrounding the outside of the lubricant storing space in the reduction gear 4b.

Figure 8A:
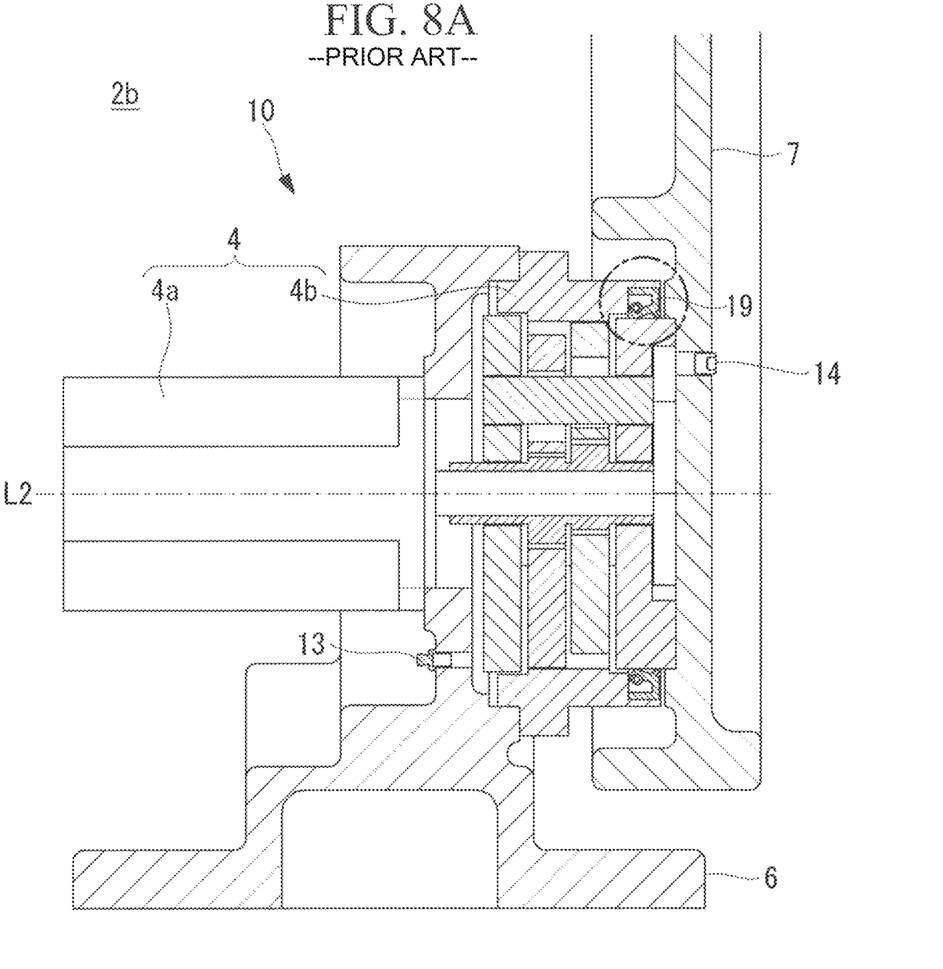
FIG. 8A is a partial longitudinal sectional view of a joint member of a related-art robot.
Figure 8B:
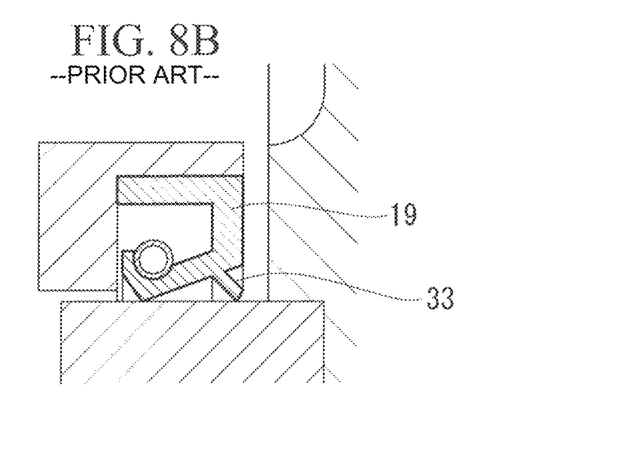
FIG. 8B is an enlarged view of an inner seal member of the joint member of the related-art robot.

The inner seal member 19 is a ring-shaped member and has a substantially U-shaped vertical sectional shape, as shown in FIG. 8B. The inner seal member 19 has a main lip provided at the radially inner side and a tapered lip 33 (dust lip) projecting from a portion of an outer wall surface of the main lip.

The outer seal member 20 is a ring-shaped member that is attached to the fixed part of the reduction gear 4b with a fastener 21 and has, as shown in FIGS. 3A, and 3B, a flange-shaped lip obliquely projecting to the radially inner side.

As shown in FIGS. 3A and 3B, the seal member 20 has a cut portion 26 provided at one circumferential position of the seal member 20. Hence, the seal member 20 can be easily attached and detached by opening the cut portion 26 in the circumferential direction.

In this embodiment, the cut portion 26 provided in the seal member 20 is inclined at a predetermined angle with respect to the radial direction and is parallel to the axial direction.

Figure 6A:
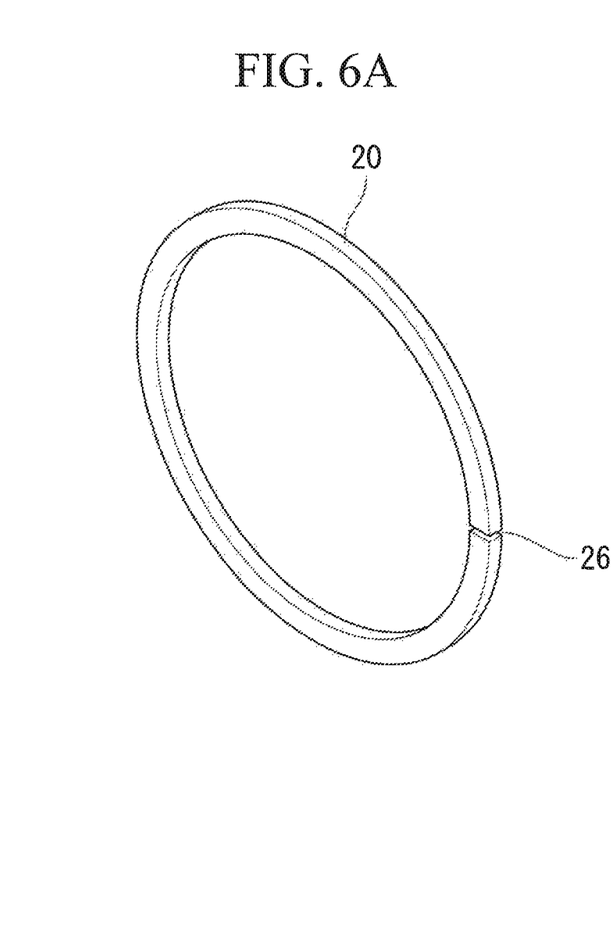
FIG. 6A is a perspective view showing an example in which, in the joint member of the robot in FIG. 5, one cut portion is provided in the seal member for sealing the gap.
Figure 6B:
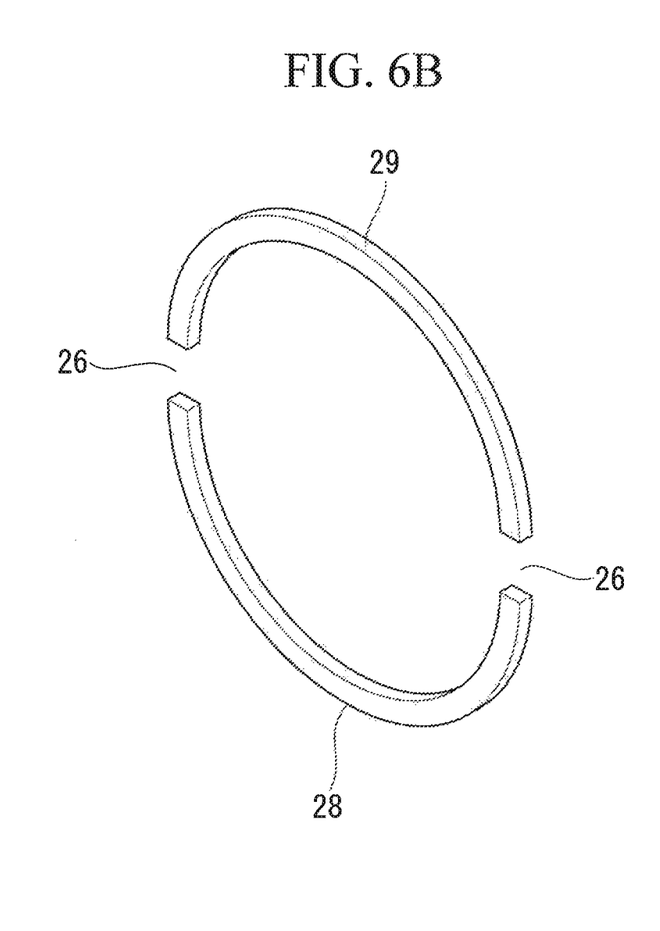
FIG. 6B is a perspective view showing an example in which, in the joint member of the robot in FIG. 5, two cut portions are provided in the seal member for sealing the gap.

As shown in FIG. 6B, by providing two or more cut portions 26, the seal member 20 may be divided into two or more independent arc-shaped members 28 and 29.

The seal members 19 and 20 are formed of an elastic rubber material or resin material. Examples of the rubber material include fluorocarbon rubber, nitrile rubber, hydrogenated nitrile rubber, and silicone rubber, and examples of the resin material include fluorocarbon resins, such as polytetrafluoroethylene resin (PTFE).

The material of the seal member 20 is selected, as appropriate, according to the use environment or the like, and a material other than the above-mentioned materials may be used.

The pressure resistance of the inner seal member 19 is set to be higher than the pressure resistance of the outer seal member 20.

The space 11 is defined between the inner seal member 19 and the outer seal member 20.

As shown in FIG. 2, the pressure-applying part 12 includes a pipe connected to the space 11 and a pneumatic-pressure source (not shown).

By supplying the air A to the interior of the space 11 with the pressure-applying part 12 to make the pressure inside the space 11 higher than the pressure of the outside air, the air A inside the space 11 acts in the direction in which the air A leaks out of the space 11 via the outer seal member 20.

The operation of the thus-configured joint structure 10 according to this embodiment will be described below.

In the joint structure 10 according to this embodiment, as a result of the pressure in the space 11 being made higher than the pressure of the outside air by the operation of the pressure-applying part 12, the air A inside the space 11 acts in the direction in which the air A leaks out of the space 11 via the outer seal member 20. As a result, the air A blocks the entrance of foreign matter, such as liquid droplets, from the outside via the outer seal member 20, whereby the entrance of foreign matter can be effectively prevented.

Because the outer seal member 20 has lower pressure resistance than the inner seal member 19, when the air pressure in the space 11 is increased by the pressure-applying part 12, the air A inside the space 11 leaks out of the outer seal member 20, which has lower pressure resistance than the inner seal member 19 having high pressure resistance. Hence, it is possible to effectively prevent the entrance of dust or the like into the reduction gear 4b via the inner seal member 19. In particular, even if the pressure resistance decreases due to degradation of the outer seal member 20, the effect of preventing the entrance of dust from the outside can be maintained by the air A that leaks to the outside via the lip of the outer seal member 20.

In this embodiment, because the seal member 20 is a lip seal, it is possible to exhibit better sealing performance against the entrance of foreign matter, such as liquid droplets, from the outside.

As shown in FIG. 3, because the seal member 20 is formed of an elastic material having the cut portion 26 at one circumferential position, the seal member 20 can be easily replaced simply by elastically deforming the seal member 20 to open the cut portion 26 in the circumferential direction.

By providing the cut portion 26 in a direction inclined with respect to the radial direction, it is possible to narrow the gap in the cut portion 26 left when the seal member 20 is attached, and thus to reduce the leakage of the air A from the cut portion 26.

By using a resin material having good oil resistance, chemical resistance, weather resistance, etc., for the seal member 20, it is possible to increase the durability of the seal member 20, and thus to stably use the seal member for a long time. The use of an elastic resin material also improves the ease of replacement of the seal member.

Figure 4:
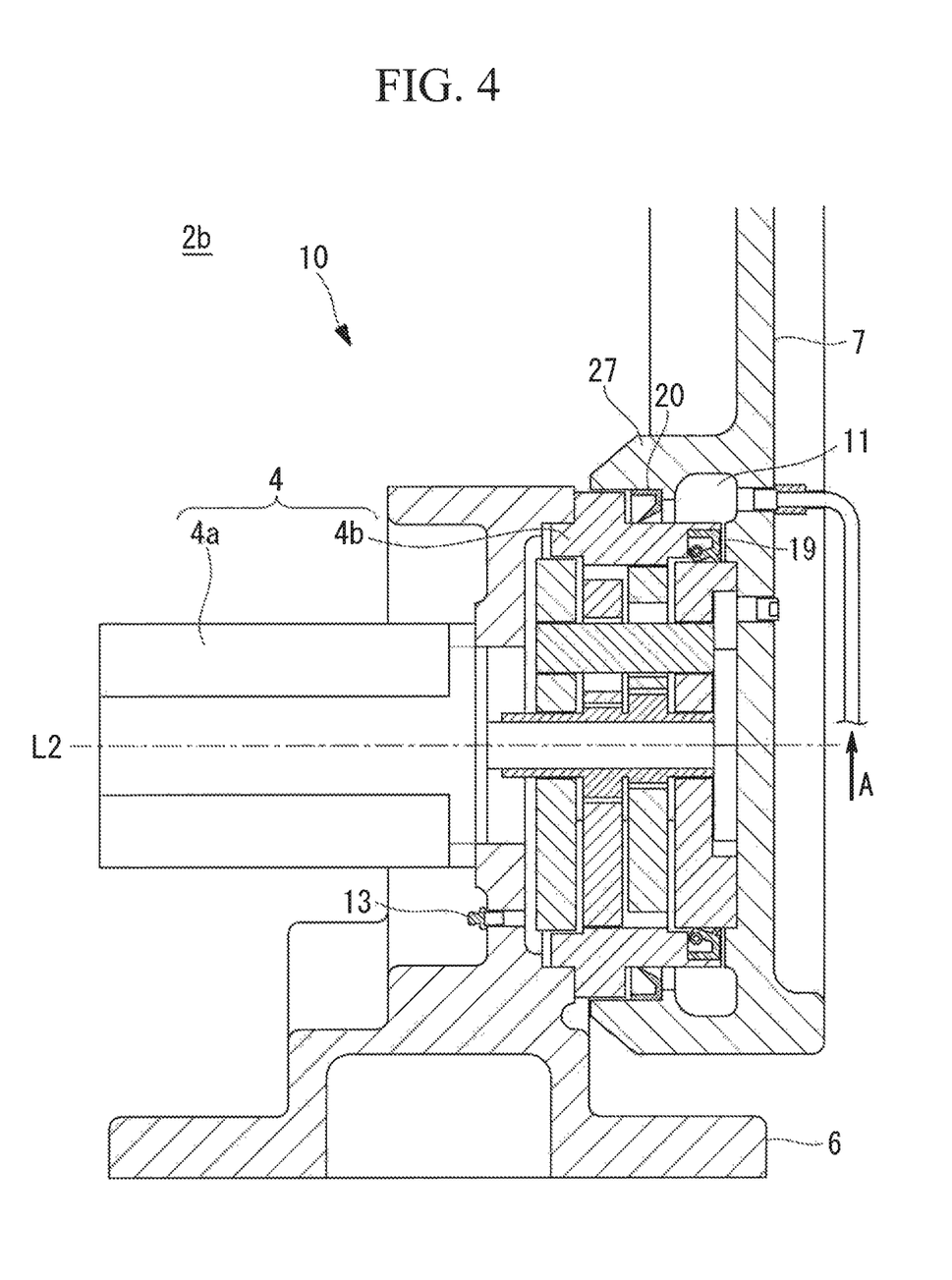
FIG. 4 is a partial longitudinal sectional view of the joint member of the robot according to the first embodiment of the present invention, and is a view showing a modification in which a protection wall is provided on the outside of an outer seal member.

In this embodiment, as shown in FIG. 4, by providing, on the outside of the outer seal member 20, a protection wall 27 that prevents the entrance of foreign matter from the outside, even when the pressures of the liquid droplets sprayed at the joint part 2b from the outside and foreign matter are high, the protection wall 27 blocks the sprayed liquid droplets and the foreign matter and prevents them from directly colliding with the outer seal member 20. Thus, damage to the outer seal member 20 can be prevented.

Figure 5:
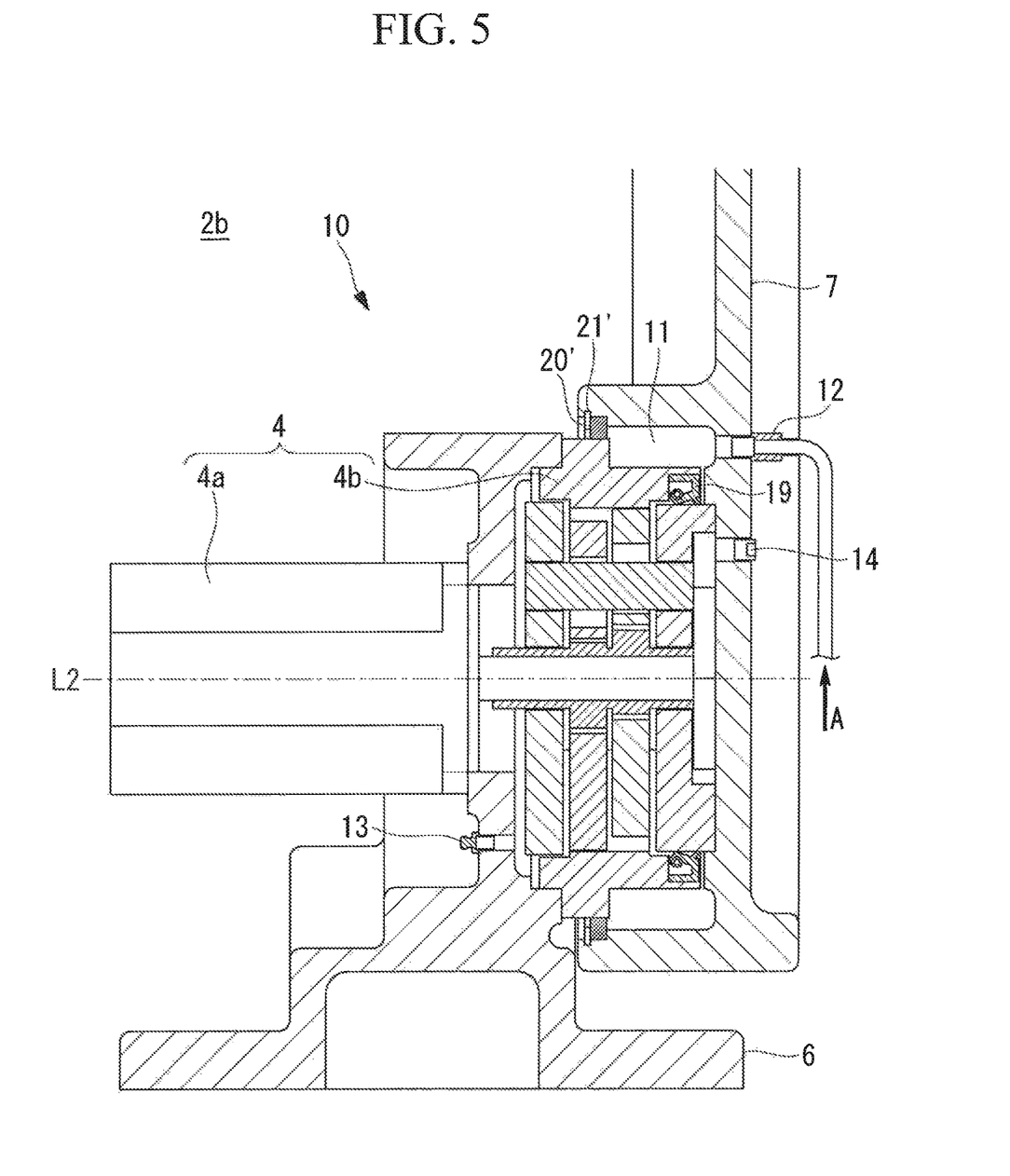
FIG. 5 is a partial longitudinal sectional view of the joint member of the robot according to the embodiment of the present invention, and is a view showing that the seal member is formed of a ring-shaped member held by a stop ring.

In the above aspect, the outer seal member may be a ring-shaped seal member 20' that is held by a stop ring 21'. When the seal member 20' as shown in FIG. 5 is used instead of the seal member 20, which is a lip seal, the sealing property is poorer than that in the case where the seal member 20 is used. However, because the air A inside the space 11 is ejected to the outside through a fine gap in the seal member 20', the entrance of the liquid droplets and foreign matter into the joint part can be prevented.

Compared with the seal member 20, which is a lip seal, lowering of the sealing property when the seal member is deteriorated or damaged can be reduced.

Regardless of the level of the surface roughness of the counterpart contact surface, the same seal member can be used, and, compared with the seal member 20, which is a lip seal, processing is easy, and thus, the production cost and the number of processes can be reduced.

The seal member 20 may be configured such that, as shown in FIG. 6A, the cut portion 26 is provided at one circumferential position, or such that, as shown in FIG. 6B, cut portions 26 are provided at two or more circumferential positions so that the seal member 20 can be divided into two or more arc-shaped members 28 and 29. These configurations make the attachment and removal of the seal member 20 even easier, leading to an advantage that the ease of replacement of the seal member 20 is improved.

By providing the flow-rate measuring unit 35 (not shown) on the robot 1 according to this embodiment to measure the flow rate of the air A supplied to the interior of the space 11, it is possible to easily determine the deterioration and damage conditions of the seal members 19 and 20, and thus to determine the replacement timing of the seal members 19 and 20.

By determining, with the determination unit 36, whether the flow rate value of the air A measured by the flow-rate measuring unit 35 is within a predetermined range, the deterioration conditions of the seal members 19 and 20 can be determined in detail.

Next, a joint structure 10 according to a second embodiment of the present invention will be described below with reference to the drawings.

In the description of this embodiment, the components common to those of the robot 1 according to the above-described first embodiment will be denoted by the same reference signs, and the descriptions thereof will be omitted.

Figure 7:
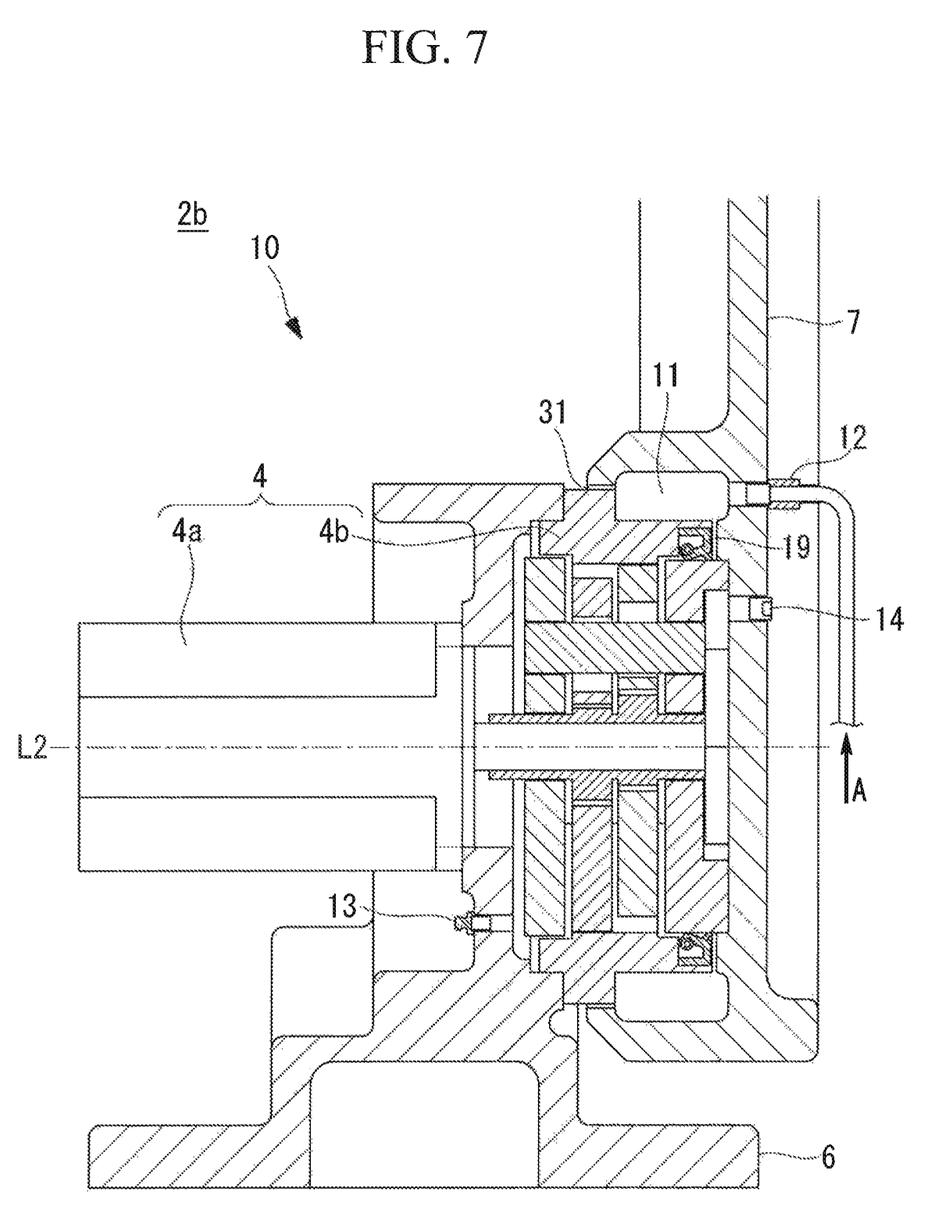
FIG. 7 is a partial longitudinal sectional view of a joint member of a robot according to a second embodiment of the present invention.

The joint structure 10 according to this embodiment differs from the joint structure 10 according to the first embodiment in that, as shown in FIG. 7, a slit forming member 31 is provided instead of the outer seal member 20.

With the joint structure 10 according to this embodiment, as a result of the pressure in a space 11 between an inner seal member 19 and the slit forming member 31 being made higher than the pressure of the outside air by the operation of a pressure-applying part 12, air A inside the space 11 acts in the direction in which it leaks out of the space 11 via the slit forming member 31. As a result, the air A blocks entrance of foreign matter, such as liquid droplets, from the outside via the slit forming member 31, whereby the entrance of foreign matter can be effectively prevented.

Compared with a case where two or more seal members are used, as in the first embodiment, it is possible to ensure sufficient sealing performance, while reducing the number of seal members used. Thus, the production cost of the seal member and the number of processes can be reduced.

In the embodiments described above, although the joint structure 10 at the joint part 2b has been described as an example, other joint parts may also have similar joint structures.

Although cases where two seal members are provided have been described in the above-described embodiments, two or more seal members may be provided.

Although ring-shaped seal members have been described as examples, instead, the seal member may be formed in other arbitrary shape.

The gas to be supplied to the interior of the space 11 is not limited to the air A, and any other arbitrary gas may be employed.

Although the present invention has been described by using the above-described embodiments, the technical scope of the present invention is not limited to the scope described in the above-described embodiments. Various changes and modifications may be made to the above-described embodiments without departing from the scope of the present invention, and the changed or modified embodiments are also included in the technical scope of the present invention.

As a result, the following aspect is read from the above described embodiment of the present invention.

An aspect of the present invention is a joint structure including: two joint members; a driving mechanism that drives the two joint members so as to rotate about a predetermined axis relative to each other; two seal members forming a seal between the two joint members at positions doubly surrounding the outside of a lubricant storing part in the driving mechanism; and a pressure-applying means that makes the air pressure in a space provided between the two seal members higher than the pressure of the outside air.

In this aspect, as a result of an inner seal member disposed at a position surrounding the outside of the lubricant storing part in the driving mechanism forming a seal between the two joint members, it is possible to prevent the lubricant from leaking out of the lubricant storing part. The lubricant in the lubricant storing part is doubly sealed by the inner seal member and an outer seal member that is disposed at a position surrounding the outside thereof so as not to leak out of the driving mechanism. As a result of the pressure in the space between the two seal members being increased by the operation of the pressure-applying means to a level higher than the pressure of the outside air, the gas inside the space acts in the direction in which it leaks out of the space via the outer seal member. Hence, the gas blocks the entrance of foreign matter, such as liquid droplets, from the outside via the outer seal member, whereby the entrance of foreign matter can be effectively prevented.

In the above aspect, at least one of the two seal members may be a lip seal.

By using a lip seal as the seal member in this way, it is possible to exhibit better sealing performance against the entrance of foreign matter from the outside.

In the above aspect, the seal member on the outer side may have lower pressure resistance than the seal member on the inner side.

With this configuration, when the pressure-applying means increases the pressure inside the space, the gas inside the space leaks out from the outer seal member having lower pressure resistance, rather than the inner seal member having higher pressure resistance. Thus, it is possible to effectively prevent leakage of gas into the lubricant storing part via the inner seal member.

In the above aspect, the joint structure may further include, on the outside of the seal member on the outer side, a protection wall that prevents the entrance of foreign matter from the outside.

With this configuration, even when the pressures of the liquid droplets sprayed at the joint part from the outside and foreign matter are high, the protection wall blocks the sprayed liquid droplets and the foreign matter and prevents them from directly colliding with the outer seal member. Thus, damage to the outer seal member can be prevented.

In the above aspect, the seal member on the outer side may be formed of an elastic material and may have a cut portion at at least one circumferential position.

Because the outer seal member is formed of an elastic material in this way, the seal member can be elastically deformed and easily removed simply by opening the cut portion provided in the seal member.

In the above aspect, the cut portion may be inclined with respect to the radial direction.

With this configuration, it is possible to narrow the gap in the cut portion left when the seal member is attached, and thus to reduce the leakage of the air from the cut.

In the above aspect, the seal member on the outer side may be formed of a ring-shaped resin material.

For example, by using, for the seal member, a resin material that is less likely to deteriorate and has good oil resistance, chemical resistance, weather resistance, etc., it is possible to increase the durability of the seal member, and thus to stably use the seal member for a long time.

The use of an elastic resin material leads to an advantage that the ease of replacement of the seal member is improved.

In the above aspect, the seal member on the outer side may have a cut portion at at least one circumferential position.

With this configuration, the seal member can be easily removed and easily replaced simply by opening the cut portion provided in the outer seal member.

In the above aspect, the seal member on the outer side may be formed of two or more arc-shaped members divided by cut portions provided at two or more circumferential positions.

By forming the outer seal member from a plurality of arc-shaped members divided into two or more, the attached and removal of the seal member becomes easy, leading to an advantage that the ease of replacement of the seal member is improved.

Another aspect of the present invention is a joint structure including: two joint members; a driving mechanism that drives the two joint members so as to rotate about a predetermined axis relative to each other; a seal member that forms a seal between the two joint members at a position surrounding the outside of a lubricant storing part in the driving mechanism; a slit forming member that is disposed at a position surrounding the outside of the seal member and that narrows the gap between the two joint members; and a pressure-applying means that makes the air pressure in a space provided between the slit forming member and the seal member higher than the pressure of the outside air.

With this aspect, as a result of an inner seal member disposed at a position surrounding the outside of the lubricant storing part in the driving mechanism forming a seal between the two joint members, it is possible to prevent the lubricant from leaking out of the lubricant storing part.

As a result of the pressure in the space between the inner seal member and the slit forming member that is disposed at a position surrounding the outside thereof to narrow the gap between the two joint members being made higher than the pressure of the outside air by the operation of the pressure-applying means, the gas inside the space acts in the direction in which it leaks out of the space via the slit forming member on the outside. Hence, the gas blocks the entrance of foreign matter, such as liquid droplets, from the outside via the slit forming member, whereby the entrance of foreign matter can be effectively prevented.

Another aspect of the present invention is a robot including any one of the above-described joint structures.

In this aspect, the robot may further include a flow-rate measuring means that measures the flow rate of gas supplied to the space by the pressure-applying means.

The amount of gas leaking to the outside increases when the seal member is deteriorated or damaged. In the above aspect, it is possible to determine deterioration of or damage to the seal member by measuring the flow rate of the gas supplied to the space with the flow-rate measuring means. As a result, it is possible to easily determine the replacement timing of the seal member with a simple configuration.

In the above aspect, the robot may further include a determination means that determines whether the seal member is deteriorated or damaged on the basis of the gas flow rate value measured by the flow-rate measuring means.

By determining whether the measured gas flow rate value is within a predetermined range or not in this way, the deterioration and damage conditions of the seal member can be determined in more detail.

The invention claimed is:

1. A joint structure comprising:
   two joint members;
   a driving mechanism that drives the two joint members so as to rotate about a predetermined axis relative to each other;
   two seal members forming a seal between the two joint members at positions doubly surrounding the outside of a lubricant storing part in the driving mechanism; and
   a pressure-applying means that makes the air pressure in a space provided between the two seal members higher than the pressure of the outside air,
   wherein the seal member on the outer side is formed of an elastic material and has a cut portion at at least one circumferential position,
   the cut portion is inclined with respect to the radial direction, and
   wherein the outer seal member is attached to a fixed part of the driving mechanism by tightening the outer peripheral surface with a fastener.

2. The joint structure according to claim 1, wherein at least one of the two seal members is a lip seal.

3. A joint structure according to claim 1, wherein the seal member on the outer side has lower pressure resistance than the seal member on the inner side.

4. The joint structure according to claim 1, further comprising, on the outside of the seal member on the outer side, a protection wall that prevents the entrance of foreign matter from the outside.

5. A robot comprising the joint structure according to claim 1.

6. The robot according to claim 5, further comprising a flow-rate measuring means that measures the flow rate of gas supplied to the space by the pressure-applying means.

7. The robot according to claim 6, further comprising a determination means that determines whether the seal member is deteriorated or damaged on the basis of the gas flow rate value measured by the flow-rate measuring means.

* * * * *